(12) United States Patent
Thibadeau

(10) Patent No.: US 7,899,186 B2
(45) Date of Patent: Mar. 1, 2011

(54) KEY RECOVERY IN ENCRYPTING STORAGE DEVICES

(75) Inventor: Robert Harwell Thibadeau, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 784 days.

(21) Appl. No.: 11/858,400

(22) Filed: Sep. 20, 2007

(65) Prior Publication Data

US 2009/0080662 A1   Mar. 26, 2009

(51) Int. Cl.
H04L 9/00 (2006.01)
(52) U.S. Cl. .................. 380/277; 380/286; 380/44
(58) Field of Classification Search ......... 380/277–279, 380/281, 284–286, 44; 713/189, 192–194
See application file for complete search history.

(56) References Cited

U.S. PATENT DOCUMENTS

| 6,067,625 | A | 5/2000 | Ryu |
|---|---|---|---|
| 6,185,308 | B1 * | 2/2001 | Ando et al. .................. 380/286 |
| 6,668,323 | B1 | 12/2003 | Challener et al. |
| 6,681,304 | B1 * | 1/2004 | Vogt et al. .................. 711/164 |
| 6,725,382 | B1 | 4/2004 | Thompson et al. |
| 6,880,054 | B2 | 4/2005 | Cheng et al. |
| 6,978,385 | B1 | 12/2005 | Cheston et al. |
| 2006/0041932 | A1 | 2/2006 | Cromer et al. |

* cited by examiner

*Primary Examiner*—Hosuk Song
(74) *Attorney, Agent, or Firm*—Robert P. Lenart, Esq.; Pietragallo Gordon Alfano Bosick & Raspanti, LLP

(57) ABSTRACT

A method for recovering a password includes: obtaining a request code from a data storage device, transmitting the request code to an external authority that produces a recovery code from the request code, and using the recovery code to recover a password and an encryption key from a hidden area of the data storage device. An apparatus that can be used to implement the method is also provided.

20 Claims, 3 Drawing Sheets

KEY RECOVERY IN ENCRYPTING STORAGE DEVICES

BACKGROUND

Certain data storage devices utilize a full disc encryption technique in which an encryption key is used to encrypt data on a storage medium. In data storage devices that incorporate firmware and hardware for key-based encryption, it is desirable to provide a mechanism for user data recovery while also protecting the data from being read by others. A secret, such as a passcode, password, or an enabling key, can be used in a variety of ways to recover the encryption key. However, if the passcode is lost, there must be some way for a user to recover it. Also, if the data must be read in its encrypted form, the user would require a copy of the encryption key to recover the data.

Systems are known in which a password is encrypted and a decryption service is used to decrypt the password. However, these systems generally require that the password and/or encryption key be transmitted over a network to the user.

SUMMARY

In a first aspect, the invention provides a method for recovering a password including: obtaining a request code from a data storage device, transmitting the request code to an external authority that produces a recovery code from the request code, and using the recovery code to recover a password and an encryption key from a hidden area of the data storage device.

In another aspect, the invention provides an apparatus including a data storage device having at least one hidden area for storing one or more passwords and/or one or more encryption keys, and software for allowing a user to enable a password recovery feature and, if the recovery feature has been enabled, for recovering the passwords and/or the encryption keys in response to a recovery code generated by an external authority.

In another aspect, the invention provides a method including: using a device specific secret key to encrypt a password to produce an encrypted password, encrypting the device specific secret key with a public key to produce an encrypted device specific secret key, destroying a plain text version of the device specific secret key, transmitting the encrypted device specific secret key to an external authority, decrypting the encrypted device specific secret key at the external authority to recover the device specific secret key, transmitting the device specific secret key to the user, and using the device specific secret key to recover the password.

These and various other features and advantages will be apparent from a reading of the following detailed description.

DETAILED DESCRIPTION OF THE INVENTION

This invention relates to data storage devices and more particularly to methods and apparatus for controlling access to information stored in data storage devices.

In one aspect, this invention provides a recovery mechanism in which the password and/or encryption key is not transmitted to the user over a network. In another aspect, the recovery mechanism can be enabled without first contacting a recovery service. The recovery mechanism can be marketed through mass-market channels, and employed without necessarily requiring special software in the host computer to which the storage device is attached.

Figure 1:
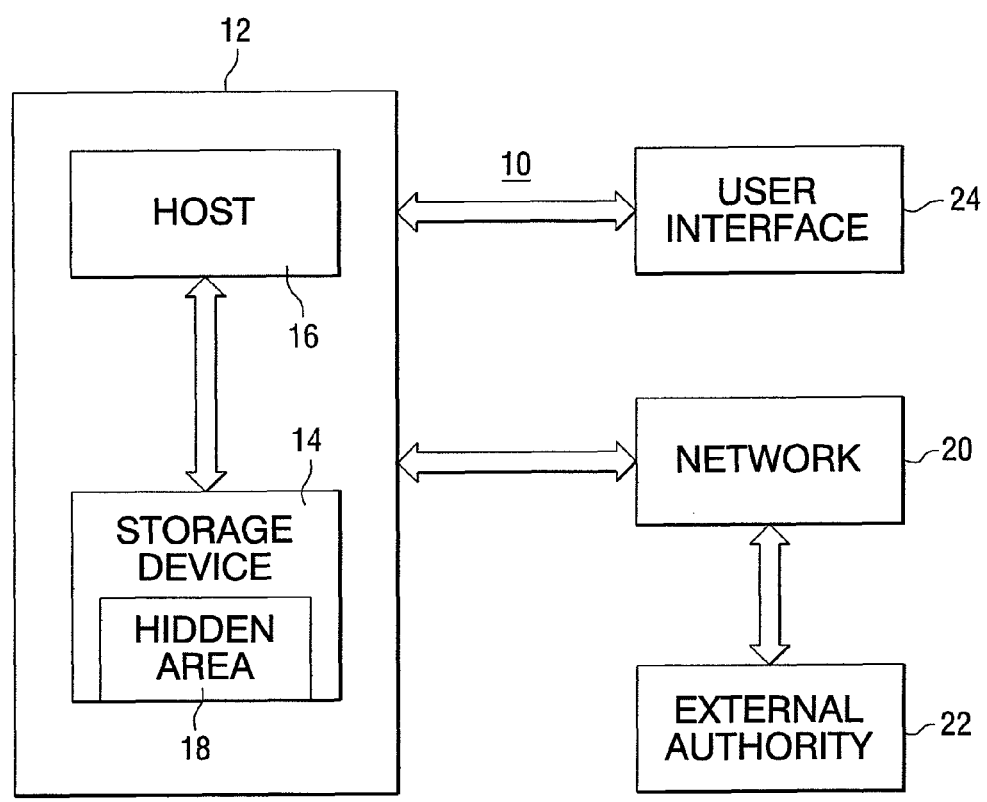
FIG. 1 is a block diagram of an apparatus that can be used to practice an aspect of the invention.

Referring to the drawings, FIG. 1 is a block diagram of an apparatus 10 that can be used to practice an aspect of the invention. The apparatus includes a computer 12 including a data storage device 14, which may be for example a disc drive, probe storage device, memory card, optical drive, flash drive, or other storage device. The computer 12 includes a host operating system 16 that communicates with the data storage device. In this example, the data storage device includes firmware and one or more data storage media. The storage media can be, for example, magnetic media, optical media, phase change media, ferroelectric media, or solid state storage devices. One or more hidden areas or secure partitions 18 can be provided on the storage media. The computer can communicate over a network 20, such as the Internet, with an external authority 22, which is also referred to as a service center. A user interface 24 is provided to allow interaction between a user and the other components of the system.

This invention can be used with an encrypting data storage device, such as an encrypting disc drive. In normal operation, after the user turns on the computer system, if a User Password has been set, during start-up the user is prompted for a password to unlock the storage device. The user supplies either the User Password or, if the User Password has been lost or forgotten, a Backup Password. The storage device verifies that the supplied password is correct. If so, the system continues its start-up activities. The user goes about his or her work as normal. When the user is finished, he or she performs a standard system shut down. All data is securely encrypted on the storage device. In this example, the storage device may have more than two passwords that function as primary or backup passwords.

In the event that the user loses or forgets the password, some means is required to recover the password. In well-known systems, when a user forgets a password, the host computer requests additional information from the user to verify the identity of the user, and then transmits the password to the user. This invention provides a method for recovering user passwords without requiring the user to remember or obtain additional identifying information specific to the host system.

The invention can be implemented using several software applications including a Boot Application for the boot drive of a computer system; a Windows Application for an attached storage device, and a Linux Application for an attached storage device. All three applications can be implemented using the same user interface components.

In one example, these applications are designed to use the Advanced Technology Attachment (ATA) Security Commands. In the case of a disc drive, the applications operate when a full disc encryption (FDE) drive is in ATA Security mode. In another type of encrypting drive, there may be different encryptions of different partitions of the storage device, and therefore more than one data encryption key, $K_f$. The application of this invention to devices that implement multiple keyed partitions will be apparent in view of this description. Each partition can be unlocked using a different password or set of passwords.

In one aspect, this invention can be implemented using a data storage device in the form of a disc drive that is configured for full disc encryption (FDE). In one example, the Boot Application includes a Master Boot Record (MBR) application, which can be preloaded on the storage device. If the storage device is the boot device, then recovery software can be loaded through the Master Boot Record process that is supported by the Basic Input/Output System (BIOS), and therefore there is no need to distribute software via other storage media or the Internet.

In the case of disc drive storage devices, the Master Boot Record (MBR) includes information in the first sector of any hard disc or diskette that identifies how and where an operating system is located so that it can be booted (i.e., loaded) into the computer's main storage or random access memory (RAM). The Master Boot Record is also sometimes called the "partition sector" or the "master partition table" because it includes a table that locates each partition that the hard disc has been formatted into. In addition to this table, the MBR can also include a program that reads the boot sector record of the partition containing the operating system to be booted into RAM. In turn, that record contains a program that loads the rest of the operating system into RAM.

The MBR can use previously known ATA Commands. At the completion of a user session, before exiting, the MBR can issue a Freezelock command. Firmware in the storage device can be used to backup passwords for later recovery, using a public key.

The Boot Application can accommodate various initial states of the storage device. In one initial state, the storage device is unlocked. During a boot sequence, a user can be presented with a screen on a user interface, which indicates that the data storage device is unlocked, and presents the user with several options, including:

1. Set a password that will lock the storage device,
2. Set a backup password,
3. Erase the storage device,
4. Save passwords and an encryption key for later recovery,
5. Don't show this menu on every boot again,
6. Exit.

If the user chooses to set a password that will lock the storage device, the user will have an opportunity to enter a password, which will be used to lock the storage device at the next reboot. If the user chooses to set a password that will be used to unlock and erase the storage device, the user will have an opportunity to enter a backup password.

If the user chooses to erase the storage device, the user will have an opportunity to enter the backup password, and after the user confirms that the storage device should be erased, the storage device will be erased.

If the user chooses to save the passwords for later recovery, the user must have already entered the passwords, and must also prove knowledge of the passwords he wishes to save for recovery. The passwords, and optionally the encryption key, will then be stored in a hidden area of the storage device that can be accessed only by going to the Web site of an external recovery authority. Normally passwords are not stored for verification, just a cryptographic hash or other one-way verification function of the passwords. The hidden area provides access control over finding the complete passwords if they are stored in plain text, but the storage device hardware may also provide a unique internal encryption key that allows the passwords to be stored encrypted on the media. Using this technique, the user does not have to have any contact with the recovery authority at this time in order to set up the storage device for recovery.

In another initial state, the storage device is locked. In this case, during the boot sequence, a user will be presented with a screen on a user interface that will prompt the user to enter a password. If a correct password is entered, the storage device will be unlocked. Once unlocked, the user will be presented with the options described above.

If the user has forgotten the password and the recovery feature has been enabled, the user can indicate that fact, for example by selecting a button on the user interface that requests the unlocking password. Then the user will be given an opportunity to request a recovery code from an external recovery authority.

To obtain the recovery code, the user will require a request code, which can be for example, the storage device serial number given on the screen. The user can then contact the recovery authority and enter this request code. The recovery authority will then use a secret key to cryptographically manipulate that request code and generate a recovery code. The secret key is a key that was used in manufacturing the storage device recovery capability. The secret key is not recorded on the storage device, but a hash or other one-way verification function of the recovery code is recorded on the storage device. Then the recovery code will be transmitted from the recovery authority to the user. The user can enter the recovery code as a password to the hidden area, and the recovery application software will retrieve the unlocking password, backup password and full disc encryption key from the data storage device. Using this technique, the recovery authority never sees the passwords or the fall disc encryption key. The passwords and encryption key never leave the drive. Therefore this backup method preserves consumer privacy.

The recovery authority Web site provides a place to enter a request code and get the recovery code. In one embodiment, the user can establish an account with the recovery authority Web site and have a recovery site password that allows the user to return to the recovery authority Web site and to block other people from recovering information for the storage device serial number. Unless a user originally enabled the password recovery feature by electing to save the passwords and encryption key for later recovery, knowledge of the recovery code cannot retrieve the passwords or encryption key.

The recovery information (i.e., the password, backup password, and local encryption key) should be writeable but not readable without knowledge of the recovery code. If the recovery option is OFF, the three values, password, backup password, and encryption key can be set to null. This guarantees that the user can choose not to have the recovery feature enabled and thereby guarantee that malicious requests for the recovery code from the recovery authority will not reveal the passwords or encryption key.

Figure 2:
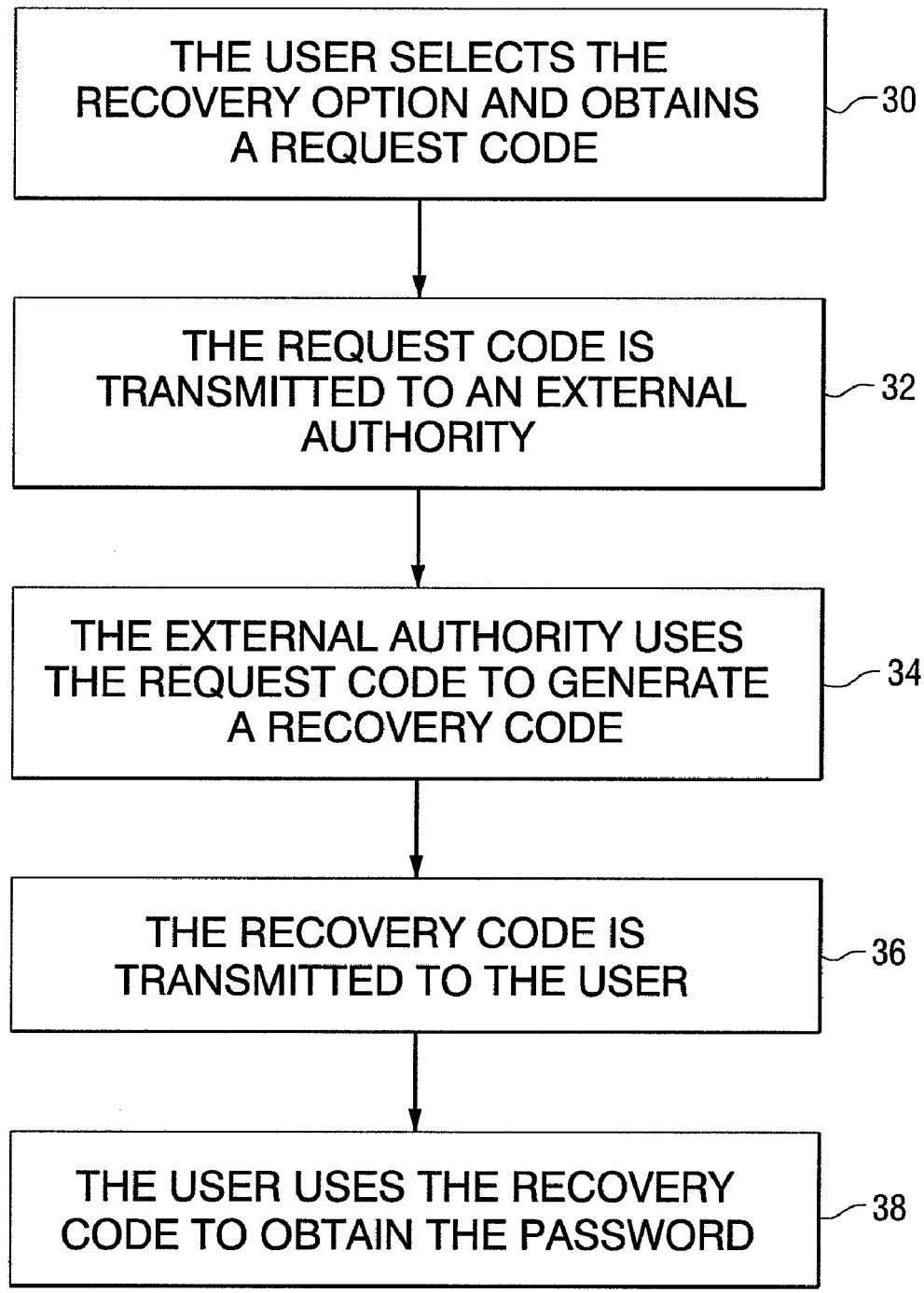
FIG. 2 is a flow diagram that illustrates one aspect of the method of the invention.

FIG. 2 is a flow diagram that illustrates an example of the method of the invention that uses a recovery code. Block 30 shows that the method begins by selecting a recovery option and obtaining a request code. Then this request code is transmitted to an external authority (block 32). The external authority uses the request code to generate a recovery code as shown in block 34. The recovery code is transmitted to the user (block 36). Then the user uses the recovery code to obtain the password (block 38).

In another example, the invention uses a symmetric key method instead of a password access method, and the user has an account at the external authority. In this example, during manufacture of the data storage device, a symmetric key K is used to encrypt the serial number of the data storage device, to produce a derived key K'=K(SN). The derived key, K', can be stored in a hidden area of the media.

A password P, and/or a data encryption key $K_f$, can also be stored on the hidden or non-hidden area of the media of the storage device encrypted using K'. During a boot sequence, the user is presented with a recovery option. If a user loses or forgets the password, a user can indicate that he or she wants to initiate a password recovery service. To perform a recovery operation, the user can access a Web site of a recovery authority, which may charge a fee for the recovery service. The authority will ask for a request code, which can be, for example, the serial number of the storage device. In this embodiment the recovery code sent back is not a password, but is a key that can decrypt the passwords and device encryption key. The authority never sees the derived key or the password.

In a variant of the symmetric key example, the symmetric key sent back by the recovery authority could be used to gain access to a hidden area by any well-known symmetric key authentication method. In this class of variant, the symmetric key may or may not be used to encrypt the password or encryption key.

In another aspect, the invention uses a public key method. As with the symmetric key method, a public key can be inserted into the data storage device at manufacturing time by the recovery authority or an agent of the recovery authority. Therefore, the user can elect to configure the storage device for password and encryption key recovery without contacting the recovery authority. A public key solution, like the symmetric key solution, can be used to protect the passwords and encryption keys by encryption or authentication, or both. The public key, PuK, can be used to locally encrypt a random number, K', used as a password encryption key and key encryption key to produce a secret S, which can be, for example, S=PuK(K'). K' is now destroyed locally. Upon loss of the password, the user asks to see one or more of the S's and sends the S's to the external authority. The external authority knows the private key, PrK, and uses it to decrypt S to obtain K'. Then the external authority transmits K' to the user.

Figure 3:
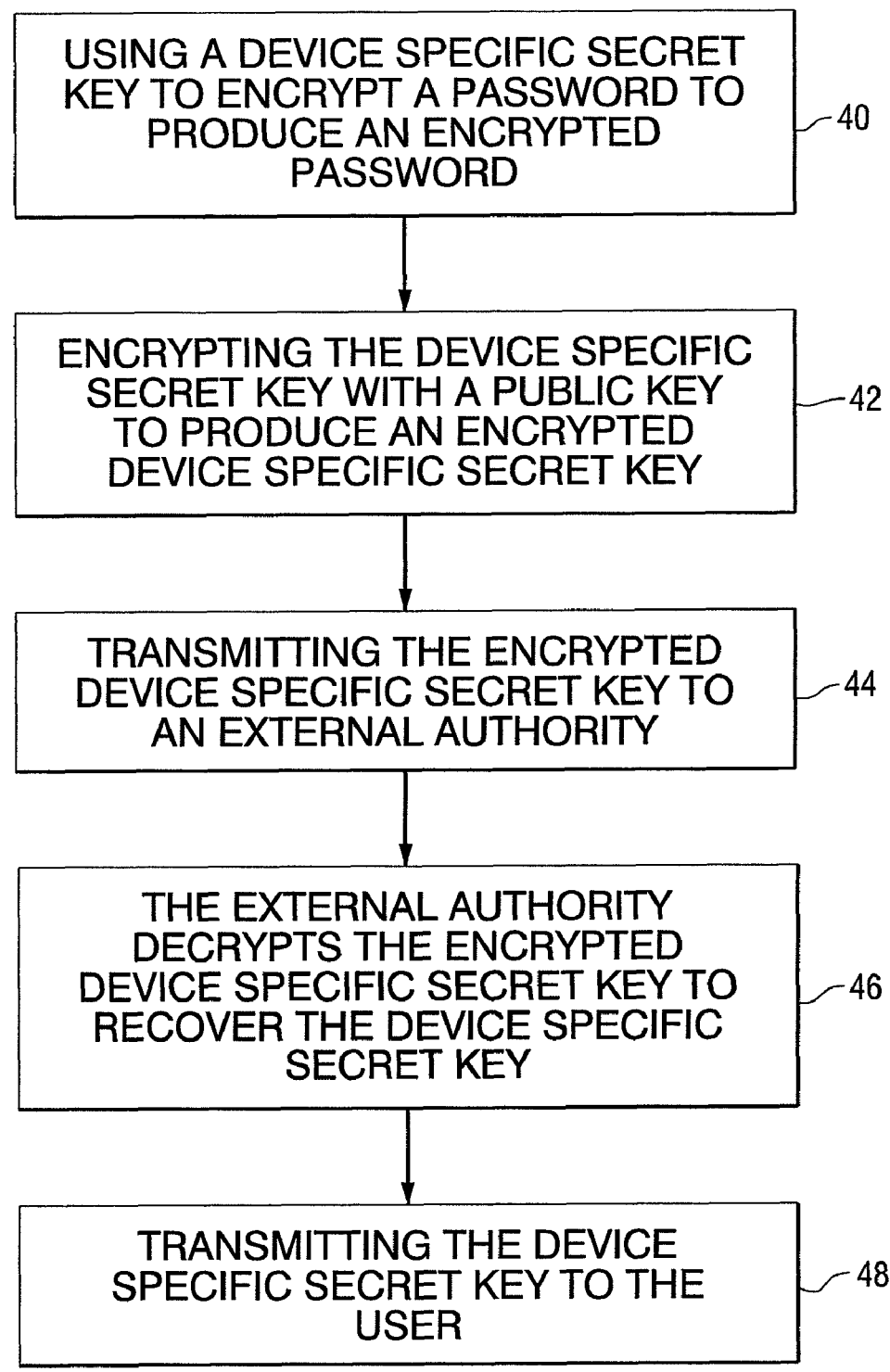
FIG. 3 is a flow diagram that illustrates another aspect of the method of the invention.

This aspect of the invention does not require that an external authority store the full disc encryption key $K_f$, or the secret S. S is only given to the external authority if the password or FDE key is lost. The password and FDE key would be decrypted on the data storage device itself, not at an external authority. FIG. 3 is a flow diagram that illustrates another embodiment of the method of the invention that uses a public/private key. The method of FIG. 3 starts by creating or using a device specific secret key to encrypt a password on a storage device to produce an encrypted copy of the password (block 40). This device specific secret key is then encrypted with an external authority's public key, and the plain text copy of the secret key is destroyed (block 42). When the user desires to recover the password, the user requests the encrypted secret key and transmits the encrypted secret key to the external authority 44. The external authority decrypts the encrypted secret key and recovers the secret key 46. Then the external authority sends the secret key to the user 48. The user can use the secret key to recover the password.

Other well-known public key techniques can be used similarly. For example, there are public key agreement methods that involve using a unique value from the storage device to recreate a symmetric encryption key. A public key can also be used for authentication, with the public key in the device authenticating a random value passed from the device to the recovery authority. Finally, public key can be used to securely send a symmetric authentication and decrypting key to the storage device. These methods also have the advantage that the recovery authority never has access to the passwords and data encryption keys.

The symmetric key method and the public key method do not require that device specific passwords or encryption keys, be known by the user. The user can have a login account at the external authority, and if so, must remember that login information, but this can be for all the devices he owns with a plurality of different passwords and different data encryption keys. The password(s) and encryption keys never leave the storage device but are protected by private key knowledge on a recovery service Internet server. In another embodiment, the passwords and encryption keys are known by the recovery service only when recovery is actually required.

As shown in the above description, in one aspect, the storage device provides the user with an option to enable a recovery function that does not require communicating with any recovery agent or service. When recovery is desired, the storage device can be queried for a request code. Then the request code would be transmitted to an external authority which generates a recovery code to input to the storage device. Upon receiving the recovery code, the storage device would make available all the passwords and encryption keys that it was saving for recovery. In various aspects, the external authority either never knows the passwords or encryption keys, or knows them only when recovery is required.

The recovery service can charge a fee to mitigate against fraud and permit a user to prevent access to the use of the service by others to mitigate further against fraud. Alternatively, the user can be allowed to opt-in on the use of this service at no charge. The keys and passcodes may be stored in a protected, inaccessible place in the storage device but in plain text or in an encrypted form that could be discovered by a malicious physical attacker of the storage device, in some of the above embodiments. Therefore the opt-in carries some risk balanced against the reduction in risk associated with the loss of the password(s) and keys(s).

The disc drive can include a Security Programmer Interface (Security API) that can be used by third party vendors to install the software necessary for the storage device to perform the functions used in various aspects of this invention.

The storage device that uses hidden storage can be formatted or partitioned without affecting the saved recovery information. The method can be considered to be an escrow mechanism in which secrets are escrowed in the storage device for subsequent use. During a recovery operation, the security of the storage device is transferred to the security of the authority's Web site.

In some aspects, the invention uses minimum functional operational control over the full disc encryption (FDE) disc drives in order to reduce the risk of disc returns and to promote the availability of additional software solutions that use the FDE drives.

The implementations described above and other implementations are within the scope of the following claims.

What is claimed is:

1. A method for recovering a password comprising:
   obtaining a request code from a data storage device;
   transmitting the request code to an external authority that uses the request code and a secret key to produce a recovery code from the request code; and
   using a one-way verification function of the recovery code stored on the data storage device to recover a password and a data storage device encryption key from a hidden area of the data storage device.

2. The method of claim 1, wherein the recovery code comprises a decryption key.

3. The method of claim 1, wherein the external authority uses a symmetric key to produce the recovery code from the request code.

4. The method of claim 1, wherein the external authority uses a public key to produce the recovery code from the request code.

5. The method of claim 1, wherein the request code comprises a secret produced in the storage device.

6. The method of claim 5, wherein the secret comprises an encrypted password or an encrypted key.

7. The method of claim 1, further comprising:
using another secret key to produce one or more encryption keys;
storing the encryption keys in one or more hidden areas of the data storage device; and
storing one or more passwords in the hidden areas.

8. A method for recovering a password comprising:
obtaining a request code from a data storage device;
transmitting the request code to an external authority that produces a recovery code from the request code;
using the recovery code to recover a password and an encryption key from a hidden area of the data storage device;
using a secret key to produce one or more encryption keys;
storing the encryption keys in one or more hidden areas of the data storage device; and
storing one or more passwords in the hidden areas, wherein the recovery code enables recovery of all passwords and encryption keys.

9. The method of claim 1, wherein the data storage device comprises a full disc encryption data storage device.

10. An apparatus comprising:
a data storage device having at least one hidden area for storing one or more passwords and/or one or more encryption keys; and
software for allowing a user to enable a password recovery feature and, if the recovery feature has been enabled, for recovering the passwords and/or the encryption keys in response to a recovery code generated by an external authority, wherein the software uses a one-way verification function of the recovery code stored on the data storage device.

11. The apparatus of claim 10, wherein the recovery code comprises a decryption key.

12. The apparatus of claim 10, wherein the external authority uses a symmetric key to produce the recovery code from the request code.

13. The apparatus of claim 10, wherein the external authority uses a public key to produce the recovery code from the request code.

14. The apparatus of claim 10, wherein the request code comprises a secret produced in the data storage device.

15. The apparatus of claim 14, wherein the secret comprises an encrypted password or an encrypted key.

16. The apparatus of claim 10, wherein the data storage device comprises a full disc encryption data storage device.

17. A method comprising:
using a device specific secret key to encrypt a password to produce an encrypted password;
encrypting the device specific secret key with a public key to produce an encrypted device specific secret key;
destroying a plain text version of the device specific secret key;
transmitting the encrypted device specific secret key to an external authority;
decrypting the encrypted device specific secret key at the external authority to recover the device specific secret key;
transmitting the device specific secret key to the user; and
using the device specific secret key to recover the password.

18. The method of claim 1, wherein the data storage device comprises an encrypting data storage device.

19. The method claim 1, wherein the request code comprises a serial number of the data storage device.

20. The apparatus of claim 10, wherein the software comprises boot application software.

\* \* \* \* \*